United States Patent
Crockett et al.

(10) Patent No.: US 10,732,648 B2
(45) Date of Patent: Aug. 4, 2020

(54) AIRCRAFT COUPLING METHOD AND SYSTEM

(71) Applicant: BAE Systems plc, London (GB)

(72) Inventors: Robert Mark Crockett, Chelmsford (GB); Gary Alexander Cousins, Chelmsford (GB)

(73) Assignee: BAE Systems plc, London (GB)

( * ) Notice: Subject to any disclaimer, the term of this patent is extended or adjusted under 35 U.S.C. 154(b) by 174 days.

(21) Appl. No.: 15/571,097

(22) PCT Filed: May 9, 2016

(86) PCT No.: PCT/GB2016/051314
§ 371 (c)(1),
(2) Date: Nov. 1, 2017

(87) PCT Pub. No.: WO2016/181117
PCT Pub. Date: Nov. 17, 2016

(65) Prior Publication Data
US 2018/0173246 A1     Jun. 21, 2018

(30) Foreign Application Priority Data

May 11, 2015  (EP) ..................................... 15167162
May 11, 2015  (GB) ................................... 1507987.4

(51) Int. Cl.
*G05D 1/10* (2006.01)
*B64D 39/00* (2006.01)
*B64D 39/06* (2006.01)

(52) U.S. Cl.
CPC ............. *G05D 1/104* (2013.01); *B64D 39/00* (2013.01); *B64D 39/06* (2013.01)

(58) Field of Classification Search
CPC ...... G05D 1/104; G05D 1/0202; G05D 1/101; B64D 39/00; B64D 39/06;
(Continued)

(56) References Cited

U.S. PATENT DOCUMENTS

| | | | | |
|---|---|---|---|---|
| 2,596,455 A | * | 5/1952 | Lammers ............... | B64D 39/00 244/135 A |
| 2,663,523 A | * | 12/1953 | Leisy ..................... | B64D 39/00 244/135 A |

(Continued)

FOREIGN PATENT DOCUMENTS

| | | |
|---|---|---|
| EP | 1424283 A1 | 6/2004 |
| EP | 1868008 A1 | 12/2007 |

(Continued)

OTHER PUBLICATIONS

International Preliminary Report on Patentability of International Application No. PCT/GB2016/051314, dated Nov. 14, 2017, 8 pages.

(Continued)

*Primary Examiner* — Hunter B Lonsberry
*Assistant Examiner* — Luis A Martinez Borrero
(74) *Attorney, Agent, or Firm* — Maine Cernota & Rardin

(57) ABSTRACT

Disclosed is a method and apparatus for physically coupling together a first aircraft and a second aircraft, for example for the purpose of performing air-to-air refueling. The first aircraft is an aircraft in flight. The second aircraft is an aircraft in flight. The method comprises: sending, from a transmitter located on the first aircraft, an electromagnetic signal; receiving, by a receiver located on the second aircraft, the signal; and controlling, by one or more processors, using the signal received by the second aircraft, at least one of the first and second aircraft such that the first and second aircraft are in a predetermined configuration in which the first and second aircraft are physically coupled together, for example attached together.

19 Claims, 3 Drawing Sheets

(58) Field of Classification Search
CPC . B64C 2201/141; B64C 39/024; B64C 1/101; G01S 19/48; G01S 5/0009; G01S 5/021
See application file for complete search history.

(56) References Cited

U.S. PATENT DOCUMENTS

| | | | | | |
|---|---|---|---|---|---|
| 2,692,102 | A | * | 10/1954 | Cobham | B64D 39/00 244/135 A |
| 4,025,193 | A | * | 5/1977 | Pond | B64D 39/00 356/5.1 |
| 4,170,773 | A | * | 10/1979 | Fitzsimmons | G01S 13/84 342/133 |
| 5,451,963 | A | * | 9/1995 | Lempicke | G01S 11/10 342/357.31 |
| 6,786,455 | B1 | * | 9/2004 | Bartov | B64D 39/00 244/135 A |
| 6,824,105 | B2 | * | 11/2004 | Edwards | B64D 39/06 244/135 A |
| 6,889,941 | B1 | * | 5/2005 | McElreath | B64C 39/024 244/135 A |
| 7,798,449 | B2 | * | 9/2010 | Small | B64C 39/024 244/1 TD |
| 8,010,287 | B1 | * | 8/2011 | Frank | B64D 39/00 701/470 |
| 8,056,860 | B2 | * | 11/2011 | Small | B64C 39/024 244/1 TD |
| 8,296,096 | B2 | * | 10/2012 | Kirby | G01B 11/002 702/150 |
| 8,344,933 | B1 | * | 1/2013 | Kronfeld | G01S 7/006 342/25 R |
| 8,463,459 | B2 | * | 6/2013 | Breshears | G01S 5/0081 342/353 |
| 8,463,534 | B2 | * | 6/2013 | Spinelli | G05D 1/104 244/135 A |
| 8,567,723 | B2 | * | 10/2013 | Etzkorn | B64D 39/00 244/135 A |
| 8,712,608 | B2 | * | 4/2014 | Pepicelli | B64C 39/024 701/11 |
| 8,843,301 | B2 | * | 9/2014 | Spinelli | G05D 1/104 244/135 A |
| 9,090,354 | B2 | * | 7/2015 | Iverson, Jr. | B64D 39/00 |
| 9,139,279 | B2 | * | 9/2015 | Heppe | B64C 37/02 |
| 9,150,310 | B1 | * | 10/2015 | Bray | B64D 39/00 |
| 9,193,458 | B2 | * | 11/2015 | Pongratz | B64C 37/02 |
| 9,534,884 | B2 | * | 1/2017 | Dowski, Jr. | G01S 5/16 |
| 9,608,862 | B2 | * | 3/2017 | Hyde | H04L 41/0803 |
| 9,731,835 | B2 | * | 8/2017 | Epsinosa Sanchez | B64D 39/06 |
| 9,933,521 | B2 | * | 4/2018 | Riley | G05D 1/0684 |
| 10,024,651 | B2 | * | 7/2018 | Johnson | G05D 1/02 |
| 10,035,606 | B2 | * | 7/2018 | Iverson, Jr. | B64D 39/06 |
| 2004/0102876 | A1 | * | 5/2004 | Doane | B64C 13/20 701/9 |
| 2004/0129865 | A1 | * | 7/2004 | Doane | G02B 5/124 250/216 |
| 2005/0116109 | A1 | * | 6/2005 | Berard | B64D 39/00 244/135 A |
| 2007/0205328 | A1 | * | 9/2007 | Iverson, Jr. | B64D 39/06 244/135 R |
| 2008/0099628 | A1 | * | 5/2008 | Greene | G05D 1/063 244/191 |
| 2008/0114544 | A1 | * | 5/2008 | Liu | G01S 19/18 701/480 |
| 2008/0204322 | A1 | * | 8/2008 | Oswald | G01S 5/04 342/465 |
| 2008/0265097 | A1 | * | 10/2008 | Stecko | G01C 21/16 244/135 A |
| 2009/0017857 | A1 | | 1/2009 | Kwon et al. | |
| 2009/0045290 | A1 | * | 2/2009 | Small | B64D 39/04 244/135 A |
| 2011/0001011 | A1 | | 1/2011 | Degiorgis et al. | |
| 2011/0113949 | A1 | * | 5/2011 | Bradley | F41H 13/0056 89/1.11 |
| 2012/0053757 | A1 | * | 3/2012 | Breshears | G01S 5/14 701/2 |
| 2012/0059536 | A1 | * | 3/2012 | Pepicelli | B64D 39/00 701/11 |
| 2012/0123668 | A1 | * | 5/2012 | Spinelli | G08G 5/0008 701/120 |
| 2012/0153084 | A1 | * | 6/2012 | Etzkorn | B64D 39/00 244/135 A |
| 2014/0142840 | A1 | * | 5/2014 | Spinelli | B64D 39/00 701/302 |
| 2014/0269414 | A1 | * | 9/2014 | Hyde | H04L 41/0803 370/254 |
| 2014/0353430 | A1 | * | 12/2014 | Rix | G05D 1/101 244/135 A |
| 2015/0136911 | A1 | * | 5/2015 | Rix | G05D 1/101 244/135 A |
| 2015/0206439 | A1 | * | 7/2015 | Marsden | G08G 5/045 701/301 |
| 2015/0293225 | A1 | * | 10/2015 | Riley | G01S 17/88 356/4.01 |
| 2015/0344147 | A1 | * | 12/2015 | Espinosa Sanchez | B64D 39/06 244/135 A |
| 2016/0001891 | A1 | * | 1/2016 | Iverson, Jr. | B67D 7/3245 244/135 A |
| 2018/0251229 | A1 | * | 9/2018 | Rastegar | B64D 39/00 |
| 2018/0350104 | A1 | * | 12/2018 | Lozano | B64D 45/0005 |
| 2018/0367212 | A1 | * | 12/2018 | Reis | H04B 7/18513 |
| 2019/0087772 | A1 | * | 3/2019 | Medina | G05D 1/101 |
| 2019/0315479 | A1 | * | 10/2019 | Tillotson | B60L 53/37 |
| 2020/0104564 | A1 | * | 4/2020 | Malecki | G05D 1/0206 |

FOREIGN PATENT DOCUMENTS

| | | |
|---|---|---|
| EP | 2338793 A1 | 6/2011 |
| WO | 0102875 A2 | 1/2001 |

OTHER PUBLICATIONS

European Search Report of European Application No. EP15167162, dated Oct. 19, 2015, 7 pages.
Peter R. Thomas et al: "Advances in air to air refueling", Progress in Aerospace Sciences, vol. 71, Nov. 1, 2014 (Nov. 1, 2014), pp. 14-35, XP055221251.
International Search Report and Written Opinion of International Application No. PCT/GB2016/051314, dated Jul. 21, 2015, 13 pages.
Search Report under Section 17(5) of Great Britain Application No. GB1507987.4, dated Nov. 10, 2015, 4 pages.

* cited by examiner

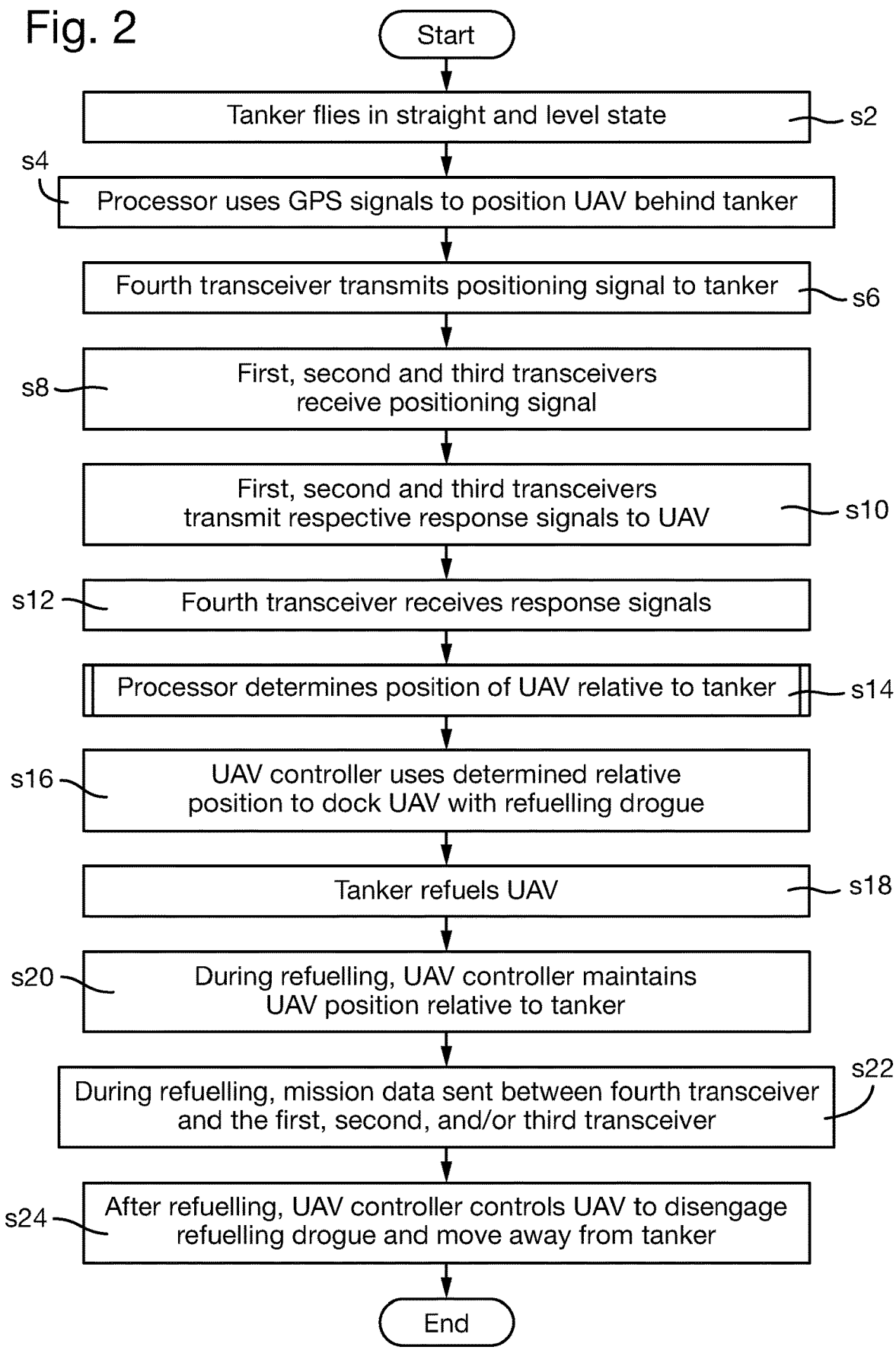

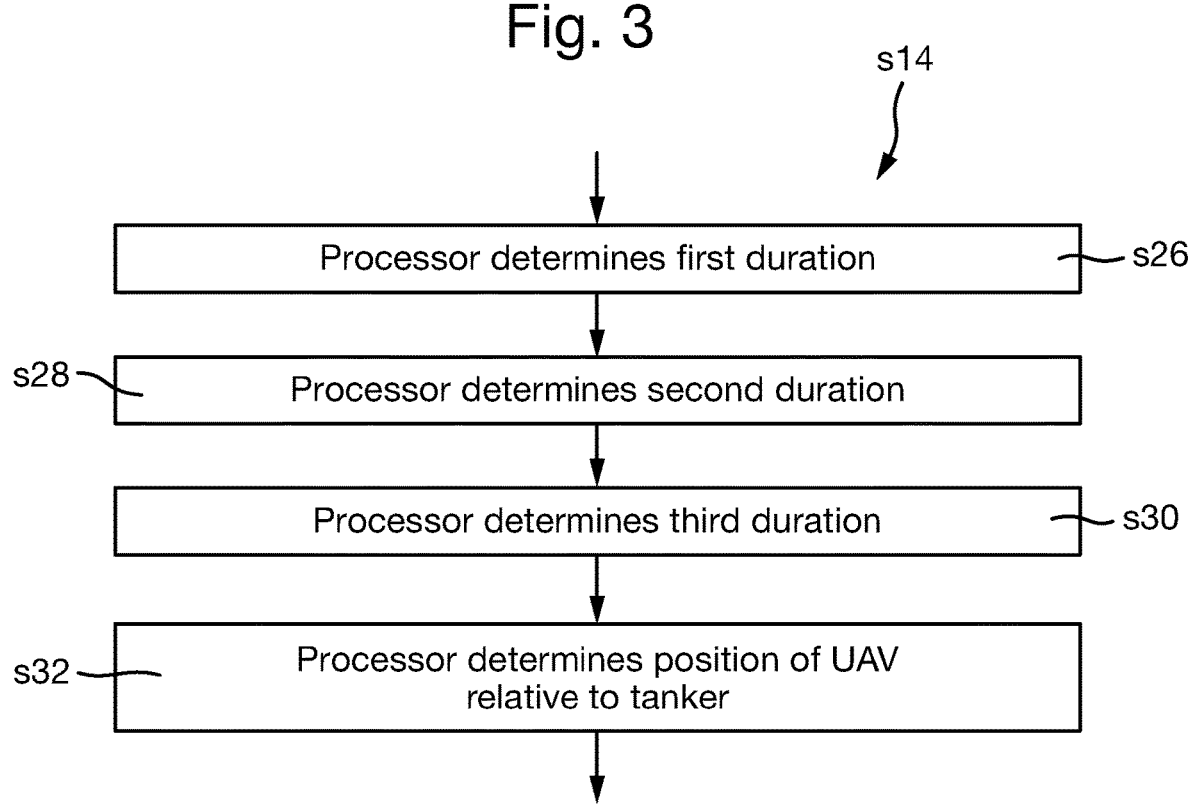

AIRCRAFT COUPLING METHOD AND SYSTEM

RELATED APPLICATIONS

This application is a national phase application filed under 35 USC § 371 of PCT Application No. PCT/GB2016/051314 with an International filing date of May 9, 2016, which claims priority of GB Patent Application GB1507987.4 filed May 11, 2015 and EP Patent Application EP15167162.5 filed May 11, 2015. Each of these applications is herein incorporated by reference in its entirety for all purposes.

FIELD OF THE INVENTION

The present invention relates to the physical coupling together of aircraft in flight, for example, for the purposes of air-to-air refuelling.

BACKGROUND

Air-to-air refuelling, also known as aerial refuelling and in-flight refuelling, is the process of transferring fuel from one aircraft (a tanker) to another aircraft during flight.

Typically, the use of radio frequency (RF) communications during air-to-air refuelling operations is not permitted due to the risk of fuel ignition.

For manned aircraft, communication via lights and hand signals is implemented. However, such methods of communication tend not to be useable for unmanned aircraft.

In a separate field to the field of aircraft refuelling, it is often desirable to transfer data, for example mission data, from an unmanned aircraft to a different entity (e.g. a different aircraft).

SUMMARY OF THE INVENTION

The present inventors have realised that, for the air-to-air refuelling of aircraft, it is desirable to have one or more operational data links between a tanker and the receiver aircraft for the purposes of navigation, maintenance of flight formation, and/or control of the refuelling process.

The present inventors have realised that as communications frequency increases, the risk of fuel ignition tends to decrease. Also, the present inventors have realised that communication frequencies in the range 57 GHz to 66 GHz, e.g. around 60 GHz, provide decreased risk of fuel ignition, for example, due to increased oxygen absorption of those communication signals. Also, the present inventors have realised that communication frequencies in the range 57 GHz to 66 GHz tend to be relatively covert, for example, due to increased oxygen absorption of those communication signals. The inventors have further realised that narrow beam width antennas may be used to further enhance the covertness of the communications.

The present inventors have realised that properties of communication frequencies in the range 57 GHz to 66 GHz that are typically regarded as disadvantageous (for example, the relatively high absorption by oxygen of those signals) provide a number of advantages when implemented during aircraft refuelling operations.

The present inventors have realised that air-to-air refuelling operations provide an opportunity to implement short-range, high bandwidth communication links for data transfer between a tanker and receiver aircraft.

In a first aspect, the present invention provides a method of physically coupling together a first aircraft and a second aircraft. The first aircraft may be an aircraft in flight. The second aircraft may be an aircraft in flight. The method comprises: sending, from a transmitter located on the first aircraft, an electromagnetic signal (e.g. a radio frequency or optical signal); receiving, by a receiver located on the second aircraft, the signal; and controlling, by one or more processors, using the signal received by the second aircraft, at least one of the first and second aircraft such that the first and second aircraft are in a predetermined configuration in which the first and second aircraft are physically coupled together.

The method may comprise providing that the transmitter and receiver are configurable to operate in a ranging mode whereby the electromagnetic signal is communicated according to a first modulation scheme, the first modulation scheme being suitable for ranging. The first modulation scheme may be an ultra-wideband modulation scheme.

The method may comprise providing that the transmitter and receiver are configurable to operate in a data link mode whereby the electromagnetic signal is communicated according to a second modulation scheme, the second modulation scheme being suitable for data transfer and different to the first modulation scheme.

The method my comprise switching at least once between operating in the ranging mode and operating in the datalink mode. In particular, the transmitter and receiver may be configured for operation in the ranging mode as the aircraft are manoeuvred into the predetermined configuration, and switch to being configured in the datalink mode once the predetermined configuration is established.

The method may comprise determining, by the one or more processors, using the signal received by the second aircraft, relative positions of the first and second aircraft. The step of controlling may include controlling, by the one or more processors, using the determined relative positions, at least one of the first and second aircraft such that the first and second aircraft are in the predetermined configuration.

The predetermined configuration may be such that the first and second aircraft are physically attached together.

At least one of the first and second aircraft may be an unmanned aircraft.

The method may further comprise performing an air-to-air refuelling process. The air-to-air refuelling process may include, when the first and second aircraft are coupled together, causing aircraft fuel to flow between the first and second aircraft via a coupling therebetween.

The transmitter on the first aircraft may be located at position on the first aircraft selected from a group of positions consisting of: a refuelling drogue of the first aircraft via which aircraft fuel may be transferred from the first aircraft to the second aircraft; and a probe of the first aircraft via which aircraft fuel may be received by the first aircraft from the second aircraft.

The signal may be a radio frequency (RF) signal. The signal may have a frequency within a frequency band selected from the group of frequency bands consisting of: a 2 GHz to 5 GHz frequency band, a 3 GHz to 5 GHz frequency band, a 50 GHz to 70 GHz frequency band, a 57 GHz to 66 GHz frequency band, and a 60 GHz to 61 GHz frequency band. The signal may have a frequency of 60 GHz or 60.5 GHz.

Sending or transmitting the signal from one aircraft to the other aircraft may be performed responsive to the aircraft being within a predetermined separation distance of each other. The predetermined separation distance may, for example be 1 km, 400 m, 300 m, 100 m, or some function of a wing span of an aircraft (for example, 2× the wing span of an aircraft).

The step of controlling may comprise, using the signal received by the second aircraft, determining a position of one aircraft relative to the other aircraft.

The method may further comprise: sending, from the first aircraft, at least one further signal, and receiving, by the second aircraft, each further signal. The step of controlling may be performed using each of the further signals received by the second aircraft.

The signal and each of the further signals may be sent from a respective transmitter on the first aircraft. Each of the transmitters may have a different position on the first aircraft. The signal and each of the further signals may include a respective identifier that indicates from which transmitter that signal was sent.

Each of the transmitters may have a position on the first aircraft selected from the group of positions consisting of: a position at or proximate to a first wing of the first aircraft; a position at or proximate to a second wing of the first aircraft, the second wing being opposite to the first wing; a position at or proximate to a first horizontal stabiliser of an empennage of the first aircraft; a position at or proximate to a second horizontal stabiliser of an empennage of the first aircraft, the second horizontal stabiliser being opposite to the first horizontal stabiliser; and a position at or proximate to a vertical stabiliser of an empennage of the first aircraft.

The method may further comprise sending, from second aircraft to the first aircraft, an initial signal, and receiving, by the first aircraft, the initial signal. Each of the signals sent from the first aircraft to the second aircraft may be sent in response to the initial signal being received by the first aircraft.

The one or more processors may be located on the second aircraft. The step of controlling may comprise controlling, by the one or more processors, the second aircraft such that the second aircraft moves so as to couple to the first aircraft.

The electromagnetic signal may be a radio frequency signal. The electromagnetic signal may be an optical signal.

In a further aspect, the present invention provides apparatus for physically coupling together a first aircraft and a second aircraft. The first aircraft may be an aircraft in flight. The second aircraft may be an aircraft in flight. The apparatus comprises: a transmitter located on the first aircraft and configured to send, from first aircraft to the second aircraft, an electromagnetic signal; a receiver located on the second aircraft and configured receive the signal sent by the transmitter; and one or more processors configured to, using the signal received by the second aircraft, control at least one of the first and second aircraft such that the first and second aircraft are in a predetermined configuration in which the first and second aircraft are physically coupled together.

In a further aspect, the present invention provides an unmanned aircraft comprising: a receiver configured to receive a signal transmitted by a further aircraft; one or more processors configured to, using the received signal, control the unmanned aircraft so as to move the unmanned aircraft into a predetermined configuration with the further aircraft and cause the unmanned aircraft to be physically coupled to the further aircraft; and means for physically coupling to the further aircraft.

In such further aspects, the receiver and/or transmitter may be operable in either a ranging mode whereby the electromagnetic signal is communicated according to a first modulation scheme, the first modulation scheme being suitable for ranging or a data link mode whereby the electromagnetic signal is communicated according to a second modulation scheme, the second modulation scheme being suitable for data transfer and different to the first modulation scheme.

BRIEF DESCRIPTION OF THE DRAWINGS

FIG. 2 is a process flow chart showing certain steps of an autonomous refuelling process; and FIG. 3 is a process flow chart showing certain steps of a process of determining a position and the orientation of one aircraft relative to a different aircraft, as performed during the process of FIG. 2.

DETAILED DESCRIPTION

Figure 1:
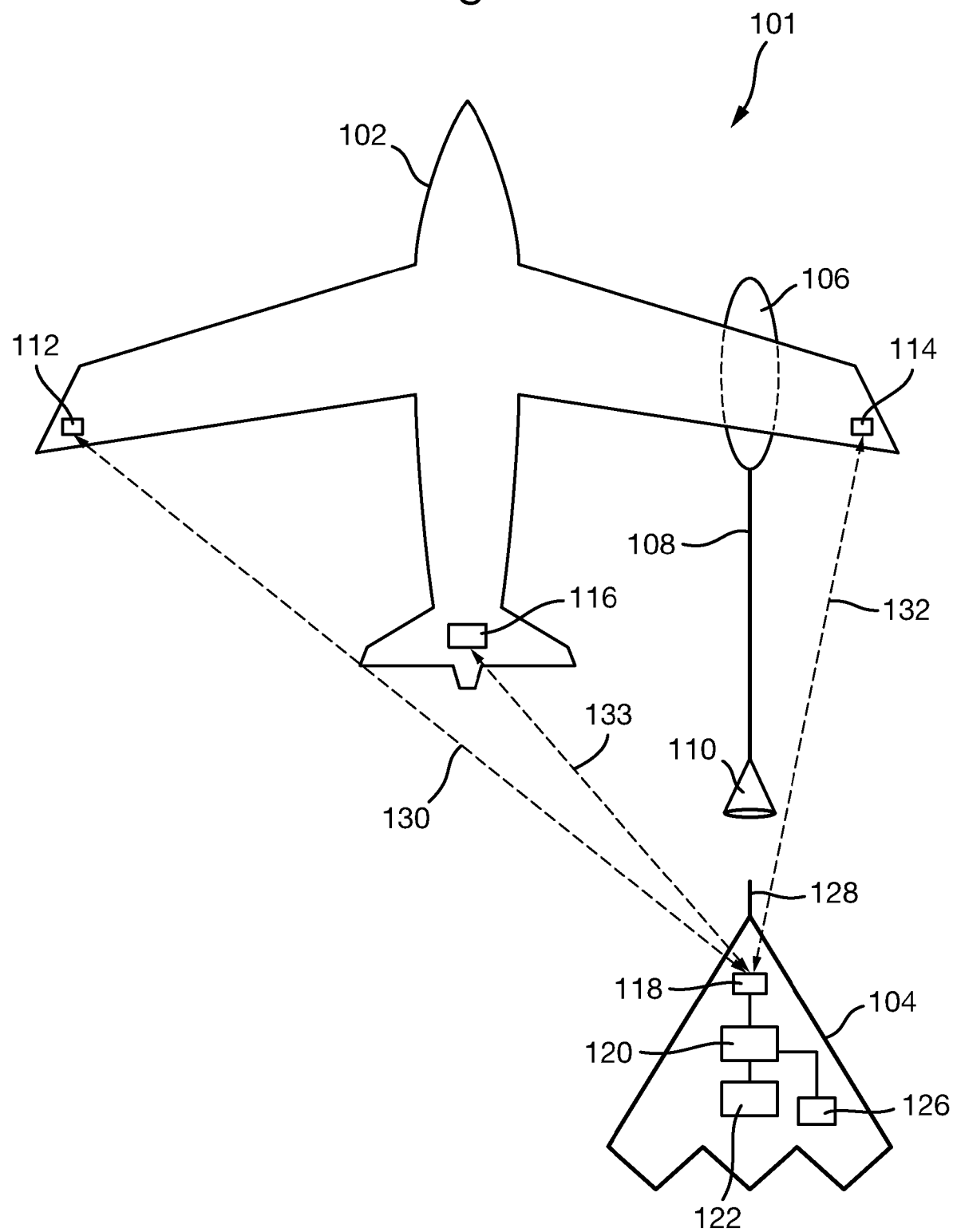
FIG. 1 is a schematic illustration (not to scale) showing a scenario in which an embodiment of an aircraft positioning and data transfer system is implemented.

FIG. 1 is a schematic illustration (not to scale) showing a scenario 101 in which an embodiment of an aircraft positioning and data transfer system is implemented.

The scenario 101 comprises a fuel tanker aircraft 102, hereinafter referred to as "the tanker", and an unmanned air vehicle (UAV) 104. In this embodiment, the aircraft positioning and data transfer system is implemented to enable autonomous air-to-air refuelling of the UAV 104 from the tanker 102.

In this embodiment, the tanker 102 is a manned fuel-transporting aircraft. The tanker 102 comprises an under-wing refuelling pod 106, a refuelling hose 108, a drogue 110, a first transceiver 112, a second transceiver 114, and a third transceiver 116.

The refuelling pod 106 is an external pod attached to a hardpoint of the tanker 102. The refuelling pod 106 contains aircraft fuel which, as described in more detail later below with reference to FIG. 2, is to be transferred to the UAV 104 during a refuelling operation. The refuelling pod 106 may include a pump for pumping aircraft fuel stored on the refuelling pod 106 to the UAV 104.

The refuelling hose 108 is a flexible hose that is connected to the refuelling pod 106 such that, in operation, aircraft fuel may be transferred from the refuelling pod 106 through the hose 108. In operation, as shown in FIG. 1, the hose 108 trails behind the tanker 102.

The drogue 110 is attached to the free end of the hose 108, i.e. the opposite end of the hose 108 to the end of the hose 108 that is attached to the refuelling pod 106. In this embodiment, the drogue 110 is a funnel-like, or cone-shaped, device that in operation, as described in more detail later below, attaches to the UAV 104 such that refuelling of the UAV 104 can take place. The drogue 110 tends to stabilise the hose 108 in flight. In this embodiment, the drogue 110 includes a valve to prevent aircraft fuel flowing out of the hose 108 until the UAV 104 is correctly docked with the hose 108 and drogue 110. In this embodiment, the diameter of the drogue 110 at its free end is approximately 1 m.

The tanker 102 further comprises a Hose Drum Unit (not shown in the Figures) that is coupled to the hose 108 and drogue 110 and is operable to reel in the hose 108 completely into the tanker 102 when the hose 108 and drogue 110 are not in use.

Each of the first, second, and third transceivers 112, 114, 116 is independently switchable between two modes of operation, namely a "ranging mode" and a "data link mode".

When operating in ranging mode, the first, second, and third transceivers 112, 114, 116 use a first modulation scheme, which is suitable for ranging. For example an ultra-wideband (UWB) modulation. The ultra-wideband modulation may have the following characteristics: a pulse bandwidth of 2.7 GHz; a centre frequency within the range 57 GHz to 66 GHz; and a maximum range of 100 m.

Advantageously, the 57 GHz to 66 GHz spectrum tends to support three 2.7 GHz channels with guard bands.

When operating in data link mode, the first, second, and third transceivers 112, 114, 116 use a second modulation scheme, which is suitable for data transfer. For example a variable bandwidth and data rate Quadrature Phase Shift Keying (QPSK) digital modulation. In this embodiment, the data link mode has a variable data rate that is inversely related to the distance between the tanker 102 and the UAV 104 and operates over a range up to 1 km. In other words, the variable rate QPSK modem increases the data rate as the range between the UAV 104 and the tanker 102 reduces. At a 1 km range between the UAV 104 and the tanker 104, the data link may be used for exchanging, e.g., GPS position data between the UAV 104 and the tanker 102. Once the UAV 104 is docked with the tanker 102, the data link could be used to exchange, for example, mission data at higher data rate.

As described in more detail later below, the first, second, and third transceivers 112, 114, 116 are each configured to receive a signal broadcast from the UAV 104. Also, the first, second, and third transceivers 112, 114, 116 are configured to send respective signals to the UAV 104 responsive to receiving a signal broadcast from the UAV 104. In this embodiment, the signals transmitted by the first, second, and third transceivers 112, 114, 116 include respective identifiers identifying the transceiver from which that transmitted signal originated, i.e., a signal transmitted by the first transceiver 112 includes an identifier for the first transceiver 112, and so on.

In this embodiment, the first and second transceivers 112, 114 are mounted to respective wings of the tanker 102. In particular, the first transceiver 112 is located at or proximate to a free end of the left-hand wing of the tanker 102 (when viewed from above as shown in FIG. 1). Also, the second transceiver 114 is located at or proximate to a free end of the right-hand wing of the tanker 102 (when viewed from above as shown in FIG. 1). Locating the first and second transceivers 112, 114 at respective tanker wing tips tends to provide substantially maximum spacing between the first and second transceivers 112, 114 on-board the tanker 102. The third transceiver 116 is located on the tail of the aircraft.

The first, second and third transceivers 112, 114, 116 are radio frequency (RF) transceivers configured to send and receive signals over a 60 GHz RF link. As described in more detail later below, the first, second, and third transceivers 112, 114, 116 are configured to transmit 60 GHz RF signals to the UAV 104. Also, the first, second, and third transceivers 112, 114, 116 are configured to receive 60 GHz RF signals broadcast from the UAV 104.

In this embodiment, the first, second, and third transceivers 112, 114, 116 are configured to, when operating in the ranging mode, have beam widths of approximately 90°. More preferably, the first, second, and third transceivers 112, 114, 116 have beam widths larger than 90° e.g. 180°. Also, these beams of the first, second, and third transceivers 112, 114, 116 are directed behind the tanker 102 along the longitudinal axis of the tanker 102.

In this embodiment, the first, second, and third transceivers 112, 114, 116 comprise respective phased array antennas configured to, when operating in the data link mode, provide a beam width of approximately 15° that can be scanned +/−60° in both azimuth and elevation. When operated in the data link mode, the antennas tend to provide a higher gain that will support a longer range data link operation. Also, the electronically steered beams of the first, second, and third transceivers 112, 114, 116 are steered behind the tanker 102 in the direction of the UAV 104.

In some embodiments, the beam widths of the first, second, and/or third transceivers 112, 114, 116 are the same in both ranging and data link modes.

In this embodiment, the UAV 104 comprises a fourth transceiver 118, a processor 120, a UAV controller 122, a global positioning system (GPS) transceiver 126, and a probe 128.

The fourth transceiver 118 has substantially the same characteristics as the first, second, and third transceivers 112, 114, 116 described in more detail earlier above. The fourth transceiver 118 may be switched between operating in the ranging mode and the data link mode.

The fourth transceiver 118 is a radio frequency (RF) transceiver configured to send and receive signals over a 60 GHz RF link. As described in more detail later below, the fourth transceiver 118 is configured to transmit 60 GHz RF signals to one or more of the transceivers 112, 114, 116 on-board the tanker 102. Also, the fourth transceiver 118 is configured to receive 60 GHz RF signals broadcast from the first, second, and/or third transceiver 112, 114, 116.

In this embodiment, when operating in ranging mode, the fourth transceiver 118 has a beam width of approximately 90°. More preferably, the fourth transceiver 118 has a beam width larger than 90° e.g. 180°. Also, this beam of the fourth transceiver 118 is directed forward from the UAV 104 along the longitudinal axis of the UAV 104 towards the tanker 102.

As described in more detail later below, the fourth transceiver 118 is configured to, when operating in ranging mode, transmit a signal (hereinafter referred to as a "positioning signal") from the UAV 104 that is received by each of the first, second, and third transceivers 112, 114, 116. Also, the fourth transceiver 118 is configured to, when operating in ranging mode, receive "response signals" sent from the first, second, and third transceivers 112, 114, 116 (i.e. signals sent from the first, second, and third transceivers 112, 114, 116 responsive to those transceivers 112, 114, 116 receiving the signal transmitted by the fourth transceiver 118). The signals sent between the fourth transceiver 118 and the first transceiver 112 are indicated in FIG. 1 by a dotted double-headed arrow and the reference numeral 130. The signals sent between the fourth transceiver 118 and the second transceiver 114 are indicated in FIG. 1 by a dotted double-headed arrow and the reference numeral 132. The signals sent between the fourth transceiver 118 and the third transceiver 116 are indicated in FIG. 1 by a dotted double-headed arrow and the reference numeral 133.

In this embodiment, the fourth transceiver 118 comprises a phased array antenna configured to, when operating in the data link mode, provide a beam width of approximately 15° that can be scanned +/−60° in both azimuth and elevation. When operated in the data link mode, the antenna of the fourth transceiver 118 tends to provide a higher gain that will support a longer range data link operation. Also, the electronically steered beam of the fourth transceiver 118 is steered in front of the UAV 104 in the direction of the tanker 102.

The fourth transceiver 118 is connected to the processor 120 such that the processor 120 may receive information from the fourth transceiver 118. Operation of the fourth transceiver 118 may be controlled by the processor 120.

The GPS receiver 126 is configured to receive GPS signals from a plurality of GPS satellites. The GPS receiver 126 is connected to the processor 120 such that the processor 120 may receive information from the GPS receiver 126. Operation of the GPS receiver 126 may be controlled by the processor 120.

As described in more detail later below with reference to FIG. 2, the processor 120 is configured to process information received by it from the fourth transceiver 118, and the GPS receiver 126.

In addition to being connected to the fourth transceiver 118 and the GPS receiver 126, the processor 120 is also connected to the UAV controller 122 such that information, such as a control signal, may be sent from the processor 120 to the UAV controller 122.

The UAV controller 122 is configured to receive information from the processor 120 and control the UAV 104 in accordance with that received information.

In this embodiment, the probe 128 on-board the UAV 104 is a rigid, protruding arm located at or proximate to the nose of the UAV 104. Preferably, the probe 128 is retractable, and is retracted when not in use. The probe 128 is a hollow pipe which includes a valve. The valve of the probe 128 remains closed until the probe mates with (i.e. connects or attaches to) a forward internal receptacle of the drogue 110. Upon attachment of the probe 128 to the drogue 110, the valve of the probe 128 (and the valve of the drogue 110) open to allow aircraft fuel to pass from the tanker 102 to the UAV 104.

Preferably, the valves in the probe 128 and the drogue 110 conform to an appropriate standard.

FIG. 2 is a process flow chart showing certain steps of a refuelling process performed by the entities shown in FIG. 1 and described in more detail above.

At step s2, the tanker 102 flies a straight and level course. In some embodiments, the tanker 102 may adopt a racetrack holding pattern.

At step s4, the processor 120 processes GPS signals received by the GPS receiver 126 from a plurality of GPS satellites. Using the processed GPS signals, the processor 120 controls, via the UAV controller 122, the UAV 104 to approach the tanker 102 from behind the tanker 102.

The processor 120 may also use a GPS location of the tanker 102 to position the UAV 104. Such a GPS position of the tanker 102 may be sent to the processor 120 from the tanker 102, for example, using any appropriate communication link between the tanker 102 and the UAV 104, e.g. a conventional RF communication link such as a Link-16 communication link, a Satcomms link, a UHF link, or an RF communication link operating within a 1.5 to 5 GHz frequency band. In some embodiments, the GPS position of the tanker 102 may be sent to the processor 120 via the 60 GHz data link between a transceiver 112, 114, 116 on-board the tanker 102 and the fourth transceiver 118.

In this embodiment, the UAV 104 is controlled to approach the rear of the tanker 102 at a constant speed and altitude.

In this embodiment, the UAV 104 is controlled by the processor 120 using the GPS signals until the UAV 104 is a predetermined distance from the tanker 102. This predetermined distance may be, for example, 100 m or a different appropriate distance.

In some embodiments, once the UAV 104 is within the predetermined distance of the tanker 102 (or a different appropriate criterion or criteria is/are met), the RF communication links by which the tanker 102 and the UAV 104 may communicate in normal operations over relatively large distances, e.g. a Link-16 communication link or an RF communication link operating within a 1.5 to 5 GHz frequency band, may be switched off. This switching-off or non-use of the "normal" RF communication links tends to reduce or eliminate a likelihood of fuel ignition caused by RF communication between the tanker 102 and the UAV 104.

At step s6, once the UAV 104 is within the predetermined distance (e.g. 100 m from the tanker 102, the fourth transceiver 118, operating in ranging mode, transmits a positioning signal from the UAV 104. In this embodiment, the positioning signal transmitted by the fourth transceiver 118 has a frequency of 60 GHz. In other embodiments, the positioning signal transmitted by the fourth transceiver 118 has a different frequency. Preferably, the positioning signal has a frequency within a frequency band of 57 GHz to 66 GHz.

Thus, in this embodiment, GPS signals exchanged between the UAV 104 and the tanker 102 allow the UAV 104 to navigation to within, for example, 100 m separation of the tanker 102. When the UAV 104 is within 100 m of the tanker 102, the transceivers 112-118 operate in ranging mode, i.e. UWB positioning takes over from GPS positioning. In ranging mode, the transmitted signals between the transceivers 112-118 may be both wide bandwidth and wide beam width, thus signal range tends to be limited. For example, increasing the navigation beam width to 90° or 180° may reduce the range of the 60 GHz signals to, for example, approximately 100 m.

At step s8, the first, second, and third transceivers 112, 114, 116 each receive the positioning signal transmitted by the fourth transceiver 118.

At step s10, in response to receiving the positioning signal, the first, second, and third transceivers 112, 114, 116 each transmit a respective response signal to the fourth transceiver 118. In this embodiment, the response signals transmitted by the transceivers 112, 114, 116 include respective identifiers that identify from which transceiver 112, 114, 116 that signal was transmitted.

In some embodiments, the ranging process is performed sequentially, with the fourth (UAV) transceiver 118 interrogating and determining a range to each of the first, second, and third (tanker) transceivers 112, 114, 116 in turn. Nevertheless, in some embodiments, the fourth transceiver 118 broadcasts a single common signal which is responded to by all recipient transceivers 112, 114, 116.

In some embodiments, spread spectrum modulation where a different respective code is allocated to each of the three tanker transceivers 112, 114, 116 may be implemented. Three matched filters on the UAV 104 may be used to facilitate the simultaneous processing of the three signals received by the fourth transceiver 118.

At step s12, the fourth transceiver 118 receives the response signals transmitted by the first, second, and third transceivers 112, 114, 116. The received response signals are relayed from the fourth transceiver 118 to the processor 120.

At step s14, the processor 120 processes the response signals received by the fourth transceiver 118 to determine a position and orientation of the UAV 104 with respect to the tanker 102.

FIG. 3 is a process flow chart showing certain steps of a process of determining the position and the orientation of the UAV 104 with respect to the tanker 102, as performed at step s14. Steps s16 to s24 of the process of FIG. 2 will be described in more detail later below after the description of the process of FIG. 3.

At step s26, the processor 120 determines the length of time between transmitting the positioning signal from the fourth transceiver 118 (performed at step s6) and receiving a response signal at the fourth transceiver 118 from the first transceiver 112. In other words, the processor 120 determines a time taken (or "time-of-flight") for a signal travelling from the fourth transceiver 118 to the first transceiver 112 and back (along communication link 130). This determined length of time is hereafter referred to as the "first duration".

At step s28, the processor 120 determines the length of time between transmitting the positioning signal from the fourth transceiver 118 (performed at step s6) and receiving a response signal at the fourth transceiver 118 from the second transceiver 114. In other words, the processor 120 determines a time taken (or "time-of-flight") for a signal travelling from the fourth transceiver 118 to the second transceiver 114 and back (along communication link 132). This determined length of time is hereafter referred to as the "second duration".

At step s30, the processor 120 determines the length of time between transmitting the positioning signal from the fourth transceiver 118 (performed at step s6) and receiving a response signal at the fourth transceiver 118 from the third transceiver 116. In other words, the processor 120 determines a time taken (or "time-of-flight") for a signal travelling from the fourth transceiver 118 to the third transceiver 116 and back (along communication link 133). This determined length of time is hereafter referred to as the "third duration".

At step s32, using the determined first, second, and third durations, the speed of light, and the known positions of the transceivers 112, 114, 116 in a coordinate frame fixed on the tanker 102, the processor 120 determines the ranges from the first, second, and third transceivers 112, 114, 116 to the fourth transceiver 118, and subsequently the position of the fourth transceiver 118 in the coordinate frame fixed on the tanker 102.

In this embodiment, the processor 120 then determines the position of the UAV 104 relative to the tanker 102, for example using additional data (i.e. in addition to the determined durations, and the known positions of the transceivers 112, 114, 116 in the coordinate frame fixed on the tanker 102). For example, the processor 120 may use data acquired from an inertial navigation system (INS) of the UAV 104 (e.g. roll, pitch, and yaw measurements of the UAV 104). Also for example, the processor 120 may use data acquired from the tanker 102, e.g. from an INS on the tanker 102 and/or GPS measurements of the tanker 102. Such data may be sent from the tanker 102 to the processor 120 on-board the UAV 104 via the 60 GHz communication link established between the transceivers 112, 114, 116, 118. Also for example, the processor 120 may use GPS measurements of the UAV 104. Also for example, the processor 120 may use measurements of an angle in which the signal was transmitted by the fourth transceiver 118 to the tanker at step s6. Also for example, the processor 120 may use measurements of the angles in which one or more of the response signals were transmitted by the first, second, and/or third transceivers 112, 114, 116 to the UAV 104 at step s10.

In some embodiments, the processor 120 uses a trilateration process to determine the relative positions of the transceivers 112-118. In some embodiments, the processor 120 uses a triangulation process to determine the relative positions of the transceivers 112-118.

In some embodiments, orientation of the UAV 104 is determined, for example, by tracking the motion of the UAV in the coordinate frame fixed on the tanker 102 to determine the time averaged heading of the UAV 104, and hence its orientation.

In some embodiments, the relative positions of the transceivers mounted on the wings of the tanker 102 (i.e. the first and second transceivers 112, 114) are dynamically determined. This advantageously tends to account for wing flexion. In some embodiments, a larger number of transceivers are mounted to the tanker 102 to facilitate such a process. In some embodiments, strain gauges are embedded in the tanker wings and may be used to determine a degree of wing flexion. Using such strain gauge measurements, the position of the wing mounted transceivers in the tanker-centric coordinate frame may be determined.

Returning now to the description of FIG. 2, at step s16, using the determined position and orientation of the UAV 104 relative to the tanker 102 determined by the processor 120, the UAV controller 122 controls the UAV 104 to fly in such a way that the probe 128 attaches to the forward internal receptacle of the drogue 110.

In this embodiment, the processor 120 sends control signals to the UAV controller 122 specifying how the UAV 104 should be moved, and the UAV controller 122 controls the UAV 104 in accordance with those received control signals.

In this embodiment, the processor 120 uses the known size/shape of the tanker 102, including the location of the drogue 110 relative to the first, second and third transceivers 112, 114, 116 to control the UAV 104 so as to connect the probe 128 to the drogue 110.

In this embodiment, during the controlling of the UAV 104 to dock with the drogue 110, measurements of the position and orientation of the UAV 104 relative to the tanker 102 are updated, i.e. further positioning and response signals are sent between the transceivers 112-118 in the same way as that described above to provide updated position/orientation measurements. In this embodiment, the update rate in which the measurements of the position and orientation of the UAV 104 relative to the tanker 102 are updated is 4 Hz, which tends to be greater than the update rate achievable using GPS which may be around 1 Hz. The updated measurements of the position and orientation of the UAV 104 relative to the tanker 102 are used to navigate the UAV 104 to dock with the drogue 110.

A 4 Hz update rate tends to be useful at relatively large ranges (~1 km) between the tanker 102 and the UAV 104. A 4 Hz update rate tends to be useful when the UAV's speed of approach to the tanker 102 is relatively slow. Larger update rates (>100 Hz) may be implemented at smaller ranges between the tanker 102 and the UAV 104, for example, during a refuelling process. This advantageously tends to enable rapid response of the autonomous control system to any changes in relative positions of the tanker 102 and UAV 104.

At step s18, once the probe 128 is attached to the drogue 110, the valves of the probe 128 and the drogue 110 open, and fuel is caused to flow from the refuelling pod 106, along the hose 108 and the probe 128, and into a fuel tank of the UAV 104. Thus, the UAV 104 is refuelled.

At step s20, during the refuelling of the UAV 104, the UAV controller 122 maintains the position and orientation of the UAV 104 relative to the tanker 102 such that the probe 128 remains connected to the drogue 110.

In this embodiment, the maintaining of the position and orientation of the UAV 104 relative to the tanker 102 includes continuously updating measurements of the position and orientation of the UAV 104 relative to the tanker 102, and using those updated measurements to control the UAV 104. The measurements of the position and orientation of the UAV 104 relative to the tanker 102 are updated as described above, i.e. by transferring positioning/response signals between the transceivers located on the UAV 104 and the tanker 102, and processing those signals to determine updated position/orientation measurements.

At step s22, during the refuelling of the UAV 104 while the UAV 104 and the tanker 102 are maintained in relatively close proximity, mission data is uploaded from the UAV 104 to the tanker 102. In this embodiment, mission data is sent from the fourth transceiver 118 on the UAV 104 to one or more of the transceivers 112, 114, 116 on the tanker 102 via one or more of the 60 GHz communication links 130, 132, 133 established between the fourth transceiver 118 and each of the first, second, and third transceivers 112, 114, 116. Thus, in this embodiment, mission data is transferred from the UAV 104 to the tanker 102 as a 60 GHz RF signal.

In some embodiments, mission data is downloaded from the tanker 102 to the UAV 104 via one or more of the 60 GHz data communication links established between the UAV 104 and the tanker 102 instead of or in addition to mission data being uploaded to the tanker 102.

In this embodiment, the 60 GHz data communication links are restricted to a maximum RF bandwidth of 900 MHz per channel. This tends to yield a raw data rate of 1.5 Gbits/s. In some embodiments, full bandwidth is only used when the UAV 104 and the tanker 102 are sufficiently close. At longer distances between the UAV 104 and the tanker 102, a relatively narrower filter may be used to achieve improved signal-to-noise characteristics.

At step s24, after the UAV 104 has been refuelled, the UAV controller 122 controls the UAV 104 to disengage from the drogue 110 and move away from the tanker 102.

Thus a refuelling process is provided.

The above described system and method advantageously tend to provide for autonomous air-to-air refuelling of a UAV.

The above described RF positioning system advantageously tends to allow for the accurate positioning of the UAV relative to the tanker. For example, an error range less than ±0.44 m (e.g. ±0.17 m) on the position of the UAV relative to the tanker tends to be possible when the UAV is within 20 m of the refuelling drogue. This tends to compare favourably to conventional GPS-based navigation systems which may give typical accuracies of ±3 m on the position of an aircraft, and thus, an accuracy range of ±6 m on the position of the UAV relative to the tanker.

Furthermore, the update rate of the above described RF positioning system is advantageously high compared to that of conventional systems, for example, the update rate of the above described RF positioning system may be around 4 Hz (or larger, e.g. >100 Hz) compared to a 1 Hz updated rate of a GPS-based positioning system.

The above described system and method advantageously tend to facilitate the docking of an aircraft that is to be refuelled with the refuelling system of a different aircraft.

Advantageously, the spacing between the first and second transceivers on the tanker is substantially maximal. This tends to increase the accuracy of the determined position and orientation of the UAV relative to the tanker.

Advantageously, the above described 60 GHz communication links established between UAV and the tanker tend to allow for opportunistic mission data transfer to be performed while the UAV and tanker are relatively close together, e.g. during the refuelling process. Furthermore, mission system data may be uploaded from the UAV to the tanker, and the tanker may then relay that information to a third party, for example, via a satellite communication link. Thus, a satellite communication system may advantageously be omitted from the UAV, thereby reducing the weight of the UAV.

Use of a relatively high frequency (i.e. 60 GHz) for the positioning system and the mission data transfer system advantageously tends to reduce the risk of fuel ignition compared to if lower frequencies were used. Furthermore, the absorption by oxygen of RF frequencies at 60 GHz tends to be relatively high compared to the absorption by oxygen of RF signals having higher or lower frequencies. Thus, the above described 60 GHz communication links between the UAV and the tanker tends to be relatively covert.

Advantageously, during the final approach of the UAV to the tanker, while the UAV is attached to the refuelling drogue, and during initial departure of the UAV from the vicinity of the tanker, the range of the 60 GHz communication link tends to be sufficiently short to support a high data rate. In particular, at short range (e.g. less than 300 m), full duplex data transfer rates of 1134 Mbit/s tend to be supported. Thus, the above described 60 GHz communication link advantageously tends to provide for short-range, rapid, non-contact data transfer. Furthermore, at relatively longer ranges between the UAV and the tanker (e.g. between 300 m and 1 km), data rates of at least 10 Mbit/s tend to be achievable.

Advantageously, the 60 GHz communication link established between the tanker and UAV may be used to control fuel transfer.

Advantageously, the 60 GHz communication link established between the tanker and UAV may use a variable rate QPSK modem. This tends to increase the data rate as the range between UAV and tanker reduced. Hence at relatively large distances, for example 1 km, the communication/data link may be used for exchanging data, such as GPS position data, between the UAV and tanker at a low data rate. A relatively small distances, for example when the UAV is docked with the tanker, the communication/data link may be used to exchange data, for example mission data etc., at a higher data rate.

Apparatus, including the processor, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the flowcharts of FIGS. 2 and 3 and described above may be omitted or such process steps may be performed in differing order to that presented above and shown in FIGS. 2 and 3. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, a single UAV is refuelled by a single tanker aircraft. However, in other embodiments there is a different number of aircraft to be refuelled (receiver aircraft) e.g. multiple UAVs. In some embodiments, multiple receiver aircraft are refuelled by a single tanker aircraft, for example, a tanker aircraft comprising multiple refuelling pods and hose/drogue assemblies. In some embodiments, there are multiple tanker aircraft. In some embodiments in which there are multiple receiver aircraft, each receiver aircraft may comprise a respective mission data transfer system transceiver and a communication link (e.g. a 60 GHz link) may be established between the tanker and each of the receiver aircraft. These multiple communication links may be used to control the receiver aircraft such that they maintain a desired formation while queuing for refuelling. Such a formation may reduce drag experienced by a number of the receiver aircraft while queuing to be refuelled. The communication links between the tanker and the receiver aircraft may be established using a time division multiple access (TDMA) process. Communication links (e.g. 60 GHz links) may also be established between the receiver aircraft, which communication links may facilitate colocation of those aircraft.

In the above embodiments, a UAV is refuelled by a manned tanker aircraft. However, in other embodiments the aircraft being refuelled may be a manned aircraft. In such embodiments, the RF positioning system may be used as a guide by a pilot of an aircraft to facilitate docking of that aircraft with the refuelling drogue of the tanker. In some embodiments, the tanker aircraft is an unmanned aircraft.

In the above embodiments, common transceivers are used by the positioning system (i.e. the system for positioning the UAV to attach to the drogue) and the mission system (i.e. the system for transferring mission data between the UAV and the tanker). However, in other embodiments, the transceivers of the positioning system may be separate to, and may operate independently from, those of the mission system.

In the above embodiments, aircraft fuel is transferred from the tanker to the UAV. However, in other embodiments, a different resource is transferred from the tanker to the UAV, for example, water or coolant. In some embodiments, aircraft fuel or another different resource is transferred from the UAV to the tanker.

In the above embodiments, the refuelling system of the tanker includes an under-wing refuelling pod, a hose, and a drogue. However, in other embodiments, the tanker includes a different type of refuelling system. For example, the tanker may include a Fuselage Refuelling Unit (FRU), or an Aerial Refuelling Boom System (ARBS). Similarly, in some embodiments, the UAV includes a different type of refuelling system to that described above with reference to FIGS. 1 to 3. In some embodiments, the tanker may comprise multiple refuelling systems such that multiple receiver aircraft may be refuelled from the tanker simultaneously.

In the above embodiments, the RF positioning system is used to perform a re-fuelling process. However, in other embodiments the RF positioning system is used to perform a different type of operation for physically coupling together two or more different aircraft. In some embodiments, the positioning system is used to attach together two or more aircraft, whereas in other embodiments, the aircraft are physically coupled in a different way (e.g. touching, but not attached). For example, a docking operation in which a smaller aircraft (e.g. a relatively small UAV) lands in or on a larger transport aircraft may be implemented using the positioning system.

In the above embodiments, the aircraft are positioned relative to one another by sending RF signals between those aircraft. In other words, the positioning system implemented in the above embodiments is an RF positioning system. However, in other embodiments a different type of positioning system may be used. For example, in some embodiments an optical positioning system in which optical signals are sent between the aircraft is used.

In the above embodiments, the position and orientation of an aircraft relative to a different aircraft is determined using the time delay between transmitting a signal and receiving a corresponding response signal. However, in other embodiments, one or more other parameters instead of or in addition to the aforementioned time delay may be used.

In the above embodiments, a signal sent from the fourth transceiver is received by the first, second, and third transceivers, and response signals are transmitted in return. However, in other embodiments, response signals are generated in a different way, for example, the signal transmitted from the UAV may be reflected by reflectors on-board the tanker. In some embodiments, a signal transmitted from one aircraft to another may include a time-stamp specifying a time at which that signal was transmitted and/or a time at which a signal was received by a particular transceiver. Such time-stamps may be used to compute the relative positions and/or orientations of the aircraft.

In some embodiments, no response signal is sent in response to receiving an RF signal. For example, in some embodiments a signal may be sent from the fourth transceiver on the UAV to the transceivers on the tanker. The respective "time of flights" of the signal received at the tanker transceivers (which may be determined from a time-stamp included in the transmitted signal) may then be used to calculate the position of the UAV relative to the tanker.

In the above embodiments, the determination of the position and orientation of the UAV relative to the tanker is determined by a processor on-board the UAV. However, in other embodiments, the determination of the position and/or orientation of the UAV relative to the tanker is determined in a different location instead of or in addition to on the UAV. For example, in some embodiments, the position and orientation of the UAV relative to the tanker is determined by one or more processors on-board the tanker. In some embodiments, positions and/or orientation determined on the tanker, and/or corresponding control signals for navigating the UAV relative to the tanker, may be sent from the tanker to the UAV via a communication link established between a tanker transceiver and the fourth transceiver.

In the above embodiments, a positioning signal is sent from the UAV to the tanker and, in response, response signals are sent from the tanker to the UAV. However, in other embodiments, a positioning signal is sent from the tanker to the UAV and, in response, response signals are sent from the UAV to the tanker.

In the above embodiments, the tanker comprises three positioning system transceivers (namely, the first, second, and third transceivers). Also, the UAV comprises a single positioning system transceiver (namely, the fourth transceiver). However, in other embodiments, the tanker comprises a different number of positioning system transceivers, for example, more than three.

Preferably, multiple positioning system transceivers are attached to each wing of the tanker. This tends to allow for the mitigation of wing flexion.

Preferably, a positioning system transceiver is fitted to the refuelling drogue. This tends to allow for the mitigation of any movement of the drogue relative to the fuselage of the tanker during flight, e.g. as a result of turbulence etc. In some embodiments, a patterned ring of LEDs is disposed on the drogue (e.g. around the edge of the drogue), and a CCD detector in implemented in the UAV to determine orientation.

Preferably, one or more positioning system transceivers are attached to a tail portion of the tanker. For example, a respective positioning system transceiver may be placed at or proximate to the tip of each horizontal stabiliser of the tanker empennage. In some embodiments, a positioning system transceiver is fixed to the tip of the vertical stabiliser of the tanker empennage. The use of such a vertical stabiliser positioning system transceiver tends to provide improved z-axis positioning of the system.

Also, in other embodiments, the UAV comprises a different number of positioning system transceivers, for example, more than one. Preferably, the UAV comprises multiple positioning system transceiver located at respective extremities of the UAV such that the spacing between the positioning system transceivers on the UAV is substantially maximised.

Preferably, at least one aircraft comprises at least three positioning system transceivers.

Use of an increased number of positioning system transceivers advantageously tends to increase accuracy, and make the system robust to transceiver failure and loss of line-of-sight between two different position system transceivers.

In the above embodiments, the transceivers have properties and attributes described in more detail earlier above with reference to FIG. 1. However, in other embodiments, one or more of the transceivers is a different type of transceiver that may have different operational properties and characteristics to those described above. In some embodiments, one or more of the transceivers has a different pulse bandwidth. In some embodiments, one or more of the transceivers has a different centre frequency. Preferably, the transceivers operate within the frequency band of 50 GHz to 70 GHz. More preferably, the transceivers operate within the frequency band of 57 GHz to 66 GHz, and more preferably within the frequency band of 60 GHz to 61 GHz. Oxygen absorption of the RF signals tend to peak within this range of frequencies, for example at 60.5 GHz. Thus fuel ignition tends to be reduced and the communication tends to be advantageously short-range and covert. In some embodiments, one or more of the transceivers may include a 60 GHz antenna comprising 52 elements in a 15 mm by 15 mm array.

In the above embodiments, the positions of the transceivers on-board the aircraft are as described in more detail above with reference to FIG. 1. However, in other embodiments, one or more of the transceivers has a different location on an aircraft to that described above.

In some embodiments, a tanker transceiver is located in or on the refuelling system of the tanker, e.g. on the hose or the drogue. Preferably, a transceiver is located at or proximate to the drogue. This location for a tanker transceiver tends to provide that the distance between that transceiver and the UAV is reduced or minimised so as to facilitate data transfer, e.g. during refuelling. Also this location for a tanker transceiver tends to provide that optimum antenna orientation during operation is achieved. Also this location for a tanker transceiver tends to provide, when that tanker transceiver is not in use, e.g. when the hose and drogue are reeled in to the HDU, the radar cross section (RCS) of that tanker transceiver is reduced or minimised.

In some embodiments the fourth transceiver is located in or on the refuelling system of the UAV, e.g. on the probe. Preferably, the fourth transceiver is located at or proximate to the probe. This location for the fourth transceiver tends to provide that the distance between the fourth transceiver and the tanker is reduced or minimised so as to facilitate data transfer, e.g. during refuelling. This tends to allow for transmit power to be reduced. Also this location for the fourth transceiver tends to provide that optimum antenna orientation during operation is achieved. Also this location for the fourth transceiver tends to provide, when the fourth transceiver is not in use, e.g. when the probe is retracted or enclosed in the body of the UAV, the radar cross section (RCS) of the fourth transceiver is reduced or minimised. Thus, the above described system and method is particularly useful when the UAV is a low-observable UAV.

In the above embodiments, the positioning system transceivers have fixed beam width of approximately 90° and the mission system transceivers have a beam width of approximately 15° that can be scanned +/−60° in both azimuth and elevation. Also, the beams of the first, second, and third transceivers are directed behind the tanker along the longitudinal axis of the tanker. Also, the beam of the fourth transceiver is directed in front of the UAV along the longitudinal axis of the UAV. However, in other embodiments, one or more of the transceivers may have a different beam width, for example a beam width of 90° or 180°, or a beam width of less than or equal to 60°. In some embodiments, one or more of the transceivers is an unsteered beam transceiver. In some embodiments, one or more of the transceivers is a steered beam transceiver. Advantageously, steered beam transceivers tend to provide reduced transmission power as they can be directed as required. In some embodiments, one or more of the transceivers is an omnidirectional transceiver, for example a steered beam transceiver that may operate in an omnidirectional mode. Thus, for example, a transceiver may switch between operating in an omnidirectional mode in which it may act as a positional system transceiver, and a steered-beam mode in which it may act as a mission system transceiver.

In the above embodiments, the vehicles with which the system and method are implemented are aircraft. However, in other embodiments, one or more of the vehicles is a different type of entity, for example, a different type of vehicle, e.g. a land-based vehicle or a water-based vehicle.

In the above embodiments, the system includes a separate mission system data link which is in addition to and independent from the communications links of the positioning system. However, in other embodiments, the separate mission system communication link is omitted.

The invention claimed is:

1. A method of physically coupling together a first aircraft and a second aircraft, the first aircraft being an aircraft in flight, the second aircraft being an aircraft in flight, the method comprising:
sending, from a transmitter located on the first aircraft, a radio frequency signal;
receiving, by a receiver located on the second aircraft, the radio frequency signal;
determining, by one or more processors, using the radio frequency signal received by the second aircraft, a position of one aircraft relative to the other aircraft; and
controlling, by one or more processors, using the determined position of one aircraft relative to the other aircraft, at least one of the first and second aircraft such that the first and second aircraft are in a predetermined configuration in which the first and second aircraft are physically coupled together,
wherein the signal is a radio frequency signal within the 57 GHz to 66 GHz frequency band.

2. The method according to claim 1 further comprising providing that the transmitter and receiver are configurable to operate in a ranging mode whereby the radio frequency signal is communicated according to a first modulation scheme, the first modulation scheme being suitable for ranging.

3. The method according to claim 1 wherein the first modulation scheme is an ultra-wideband modulation scheme.

4. The method according to claim 1 further comprising providing that the transmitter and receiver are configurable to operate in a data link mode whereby the radio frequency signal is communicated according to a second modulation scheme, the second modulation scheme being suitable for data transfer and different to the first modulation scheme.

5. The method according to claim 4 comprising:
providing that the transmitter and receiver are configurable to operate in a ranging mode whereby the radio frequency signal is communicated according to a first modulation scheme, the first modulation scheme being suitable for ranging; and
switching at least once between operating in the ranging mode and operating in the datalink mode.

6. The method according to claim 5 wherein the transmitter and receiver are configured for operation in the ranging mode as the aircraft are manoeuvred into the predetermined configuration, and switch to being configured in the datalink mode once the predetermined configuration is established.

7. The method according to claim 1, the method further comprising performing an air-to-air refuelling process including, when the first and second aircraft are physically coupled together, causing aircraft fuel to flow between the first and second aircraft via a coupling between the first and second aircraft.

8. The method according to claim 7, wherein the transmitter on the first aircraft is located at position on the first aircraft selected from the group of positions consisting of: a refuelling drogue of the first aircraft via which aircraft fuel may be transferred from the first aircraft to the second aircraft; and a probe of the first aircraft via which aircraft fuel may be received by the first aircraft from the second aircraft.

9. The method according to claim 1, wherein the method further comprises:
sending, from the first aircraft, at least one further signal; and
receiving, by the second aircraft, each further signal, wherein the step of controlling is performed using each of the further signals received by the second aircraft.

10. The method according to claim 9, wherein:
the signal and each of the further signals are sent from a respective transmitter on the first aircraft;
each of the transmitters has a different position on the first aircraft; and
the signal and each of the further signals includes a respective identifier that indicates from which transmitter that signal was sent.

11. The method according to claim 10, wherein each of the transmitters has a position on the first aircraft selected from the group of positions consisting of:
a position at or proximate to a first wing of the first aircraft;
a position at or proximate to a second wing of the first aircraft, the second wing being opposite to the first wing;
a position at or proximate to a first horizontal stabiliser of an empennage of the first aircraft;
a position at or proximate to a second horizontal stabiliser of an empennage of the first aircraft, the second horizontal stabiliser being opposite to the first horizontal stabiliser; and
a position at or proximate to a vertical stabiliser of an empennage of the first aircraft.

12. The method according to claim 1, wherein:
the method further comprises sending, from the second aircraft to the first aircraft, an initial signal; and
receiving, by the first aircraft, the initial signal; wherein each of the signals sent from the first aircraft to the second aircraft are sent in response to the initial signal being received by the first aircraft.

13. The method of physically coupling together a first aircraft and a second aircraft, the first aircraft being an aircraft in flight, the second aircraft being an aircraft in flight according to claim 1 wherein the signal frequency is approximately 60 GHz.

14. An unmanned aircraft comprising:
a receiver configured to receive a radio frequency signal transmitted by a further aircraft;
one or more processors configured to:
using the received signal, determine a position of the unmanned aircraft relative to the further aircraft; and
using the determined position of the unmanned aircraft relative to the further aircraft, control the unmanned aircraft so as to move the unmanned aircraft into a predetermined configuration with the further aircraft and cause the unmanned aircraft to be physically coupled to the further aircraft; and
a coupler configured to allow the unmanned aircraft to couple to the further aircraft,
wherein the signal is a radio frequency signal within the 57 GHz to 66 GHz frequency band.

15. A system comprising:
the unmanned aircraft according to claim 14; and
a further aircraft comprising a transmitter configured to send, from the further aircraft to the unmanned aircraft, a radio frequency signal.

16. The system according to claim 15 wherein the signal frequency is approximately 60 GHz.

17. The unmanned aircraft according to claim 14 wherein the receiver and/or transmitter is operable in either a ranging mode whereby the radio frequency signal is communicated according to a first modulation scheme, the first modulation scheme being suitable for ranging or a data link mode whereby the radio frequency signal is communicated according to a second modulation scheme, the second modulation scheme being suitable for data transfer and different to the first modulation scheme.

18. An apparatus for physically coupling together a first aircraft and a second aircraft while the first aircraft and the second aircraft are in flight, the apparatus comprising:
a transmitter located on the first aircraft, the transmitter being configured to send a radio frequency signal;
a receiver located on the second aircraft, the receiver being configured to receive the signal;
one or more processors configured to:
using the signal received by the second aircraft, determine a position of one aircraft relative to the other aircraft; and
control, using the determined position of one aircraft relative to the other aircraft, at least one of the first and second aircraft such that the first and second aircraft are in a predetermined configuration in which the first and second aircraft are physically coupled together,
wherein the signal is a radio frequency signal within the 57 GHz to 66 GHz frequency band.

19. The apparatus for physically coupling together a first aircraft and a second aircraft while the first aircraft and the second aircraft are in flight according to claim 18 wherein the signal frequency is approximately 60 GHz.

* * * * *